United States Patent
Grupp et al.

(10) Patent No.: US 7,249,810 B2
(45) Date of Patent: Jul. 31, 2007

(54) METHOD FOR MAINTAINING A DESIRED BRAKING TORQUE

(75) Inventors: Bernhard Grupp, Weingarten (DE); Bernhard Reisch, Isny (DE); Frank Sauter, Meckenbeuren (DE); Peter Schmidtner, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/466,993

(22) PCT Filed: Jan. 19, 2002

(86) PCT No.: PCT/EP02/00531

§ 371 (c)(1),
(2), (4) Date: Jul. 22, 2003

(87) PCT Pub. No.: WO02/058978

PCT Pub. Date: Aug. 1, 2002

(65) Prior Publication Data

US 2004/0050633 A1   Mar. 18, 2004

(30) Foreign Application Priority Data

Jan. 24, 2001   (DE) .............................. 101 03 011

(51) Int. Cl.
*B60T 8/36* (2006.01)
(52) U.S. Cl. .................. 303/125; 303/20; 303/155
(58) Field of Classification Search .............. 303/125, 303/20, 155
See application file for complete search history.

(56) References Cited

U.S. PATENT DOCUMENTS

| 3,882,973 | A | * | 5/1975 | Hakes ................ 188/181 R |
| 3,931,870 | A | * | 1/1976 | Memmer ................ 188/296 |
| 5,184,875 | A | * | 2/1993 | Wrede ..................... 303/3 |
| 5,441,335 | A | * | 8/1995 | Stumpe et al. .............. 303/3 |
| 5,618,084 | A | * | 4/1997 | Reiner ..................... 303/3 |
| 6,299,263 | B1 | * | 10/2001 | Uematsu et al. .......... 303/192 |
| 6,485,111 | B2 | * | 11/2002 | Suo et al. ................ 303/20 |
| 6,619,760 | B1 | * | 9/2003 | Anwar .................... 303/20 |
| 6,695,416 | B1 | * | 2/2004 | Reiner ................... 303/125 |
| 2003/0117012 | A1 | * | 6/2003 | Anwar et al. ............ 303/20 |
| 2003/0189375 | A1 | * | 10/2003 | Raad .................... 303/20 |
| 2004/0119333 | A1 | * | 6/2004 | Hackl ................... 303/125 |

FOREIGN PATENT DOCUMENTS

| DE | 33 21 948 C2 | 9/1988 |
| DE | 44 08 350 C2 | 8/1995 |
| DE | 44 20 116 A1 | 12/1995 |
| DE | 196 42 344 A1 | 4/1997 |
| DE | 198 22 859 A1 | 7/1999 |
| DE | 198 43 580 A1 | 3/2000 |

* cited by examiner

*Primary Examiner*—Robert A. Siconolfi
(74) *Attorney, Agent, or Firm*—Davis & Bujold, P.L.L.C.

(57) ABSTRACT

A stepped braking system is used as a function of the required braking torque in this method for maintaining a desired braking torque in a vehicle equipped with stepped and infinitely-variable permanent braking systems whereby simultaneous activation of the stepped and infinitely-variable braking systems occurs in such manner that the sum of the participations of the different systems provides the required braking torque at any time.

6 Claims, 2 Drawing Sheets

METHOD FOR MAINTAINING A DESIRED BRAKING TORQUE

FIELD OF THE INVENTION

The present invention concerns a method for using the wear-free braking system and in particular for maintaining a desired braking torque of a motor vehicle.

BACKGROUND OF THE INVENTION

In the state of the prior art, nowadays and especially in goods vehicles, permanent braking units (wear-free brake systems) are used to relieve the load on the operating brakes. Permanent braking units can also improve the economy of goods vehicles by allowing higher average speeds (especially on long downhill drives) and by considerably reducing the wear of the brake linings of the operating brakes.

Engine brake systems are used as permanent brakes which, during a thrust operation, produce a braking torque that depends on the gear engaged. In addition, retarder brakes are known to convert kinetic energy into heat energy, which differ in their manner of energy conversion in that with hydrodynamic retarders, the energy is converted by fluid friction and, with electrodynamic retarders, by means of a magnetic field. Retarders act as virtually wear-free permanent brakes, especially for goods vehicles and locomotives, since they have the advantage of converting the energy to be braked into heat without wear over long periods of time.

In hydrodynamic retarders, the energy flow of a fluid is utilized for braking, the physical action principle corresponding to that of a hydrodynamic clutch with fixed turbine. According to this, a hydrodynamic retarder comprises a rotor in the fluid flow path and a stator fixedly attached to the retarder housing. When the retarder is actuated, a quantity of oil corresponding to the desired braking performance is introduced into the turbine blade area, which the rotor impels against the stator so that a braking action is exerted on the rotor.

In electrodynamic retarders, on the other hand, the principle used for braking is that of the action of force in electromagnetic fields. Here, a stator is provided with several energizing coils and attached to the transmission housing. Air-cooled rotors are also provided on the transmission-gear side, which are usually connected to the drive shaft. For braking, the energizing coils are supplied with current. As the rotors pass through the magnetic field, eddy currents are induced which impede the rotary movement of the rotors.

Depending on their arrangement in the drive train, retarders are divided into primary and secondary retarders, primary retarders being arranged on the engine side and secondary retarders on the transmission side. In the present state of the art, electrodynamic retarders are mainly arranged as secondary retarders. This means that primary retarders operate as a function of the engine speed, while secondary retarders operate as a function of the speed of the vehicle.

In addition, permanent braking systems are divided into stepped and infinitely-variable systems; stepped systems are the engine brakes and the electrodynamic retarders. In contrast to the infinitely-variable systems, such as hydrodynamic retarders, the braking performance can only be varied in steps.

Permanent brakes are particularly important in the case when the speed must be kept constant downhill, but this often entails discomfort for the driver.

At lower drive shaft speeds, hydrodynamic secondary retarders have their system limits, i.e., the braking torque produce is no longer sufficient. In addition, with hydrodynamic secondary retarders and, as a rule at high drive shaft speeds, the power is limited or reduced in order to protect the engine cooling system.

Accordingly, the purpose of the present invention is to indicate a method for maintaining a desired braking torque with optimum utilization of the wear-free braking systems of a motor vehicle.

For this, it is proposed to combine the strengths of the available braking systems (e.g., hydrodynamic+electrical secondary retarder, hydrodynamic secondary retarder+engine braking). In this way the weaknesses of the available various respective braking systems can be compensated.

SUMMARY OF THE INVENTION

According to the invention, the method proposed here can be used for any operation mode, including the regulation of a constant speed on a gradient and maintaining a constant braking torque or maintaining a constant delay.

Thus, for example, the function of maintaining a constant speed on a gradient can be implemented using several mutually independent braking systems, with stepped and infinitely-variable braking systems acting in combination. The function described can, therefore, be implemented over nearly the entire speed range.

The prerequisite is to know the braking behavior of the different systems. For this purpose, the parameters that characterize the system behaviour of the various braking systems, for example, the performance graphs of the system, are stored in a memory and the actual braking behavior is measured or calculated.

The performance of the permanent braking system can be improved by using braking systems with different energy balances, thanks to the method according to the invention Furthermore, a stepped braking system can also be used in combination with an infinitely-variable braking system to perform the function of maintaining constant speed on a gradient without compromising comfort.

The combination of braking systems makes it possible to utilize the different strengths of the systems; for example, at the performance limit of the hydrodynamic secondary retarder the primary retarder or an electrical secondary retarder can be used additionally.

BRIEF DESCRIPTION OF THE DRAWING

The invention will now be described, by way of example, with reference to the accompanying drawings in which.

DETAILED DESCRIPTION OF THE INVENTION

Figure 1:
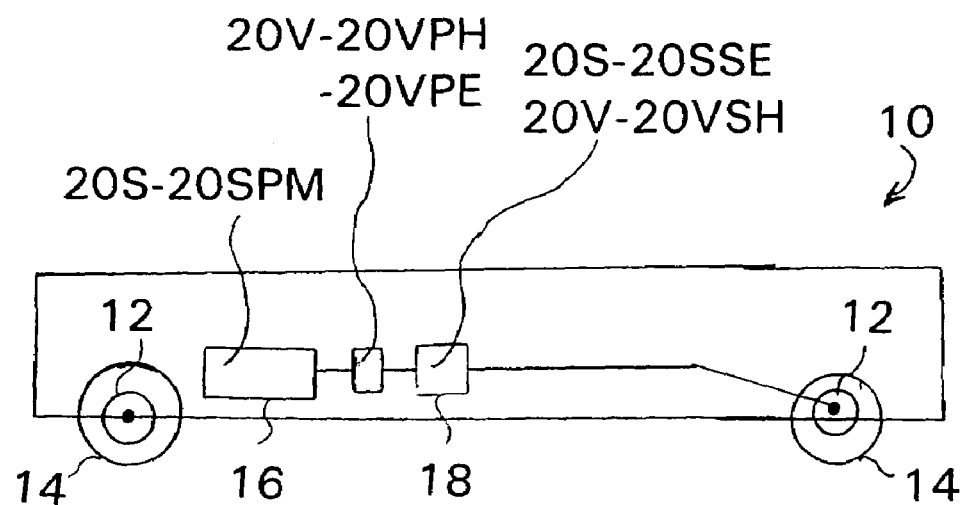
FIG. 1 is a diagrammatic representation of a vehicle braking system including a conventional braking system and stepped and infinitely variable permanent brakes.

As shown in FIG. 1, and described in the Background of the Invention for example, at least some vehicles 10 to have both conventional brakes 12 operating on the wheels 14 and one or more permanent braking units. As is well known, permanent braking units reduce the wear on conventional brakes 12 by providing braking force in certain circumstances, such as on downhill sections of roads, thereby reducing the use wear of the conventional brakes 12.

As described, permanent braking units may typically comprise the engine operating in an engine braking mode or various forms of retarders. As is well known, an engine 16 operates as a permanent braking unit when providing engine braking, which occurs when the drive train comprising the engine 16, the transmission 18 and the driving wheels 14 of the vehicle 10 are engaged, but the engine 16 operates at a speed lower than that required to sustain a current speed of the vehicle 10. In this instance, the vehicle drive wheels 14 will drive the engine 16, rather than the engine 16 driving the wheels 14, so that the engine will exert a braking force on the driving wheels 14 through the transmission 18. As is well known, the braking torque or force provided by engine braking is dependent on the speed of the engine 16 and upon the gear ratio of the transmission 18, so that the braking force provided by the engine 16 is generally selectable in discrete steps or levels of braking force, generally determined by the transmission ratio and the engine speed.

Retarders are typically of either of two basic types, that is, hydrodynamic retarders or electrodynamic retarders, which exert a braking torque or force on the wheels 14 by a mechanism that dissipates drive torque, that is, kinetic energy from the wheels 14, as heat energy, thereby exerting a braking force on the wheels 14.

In hydrodynamic retarders, the energy flow of a fluid is utilized for braking, the physical action principle corresponds to that of a hydrodynamic clutch with fixed turbine. According to this, a hydrodynamic retarder comprises a rotor in the fluid flow path and a stator fixedly attached to the retarder housing. When a hydrodynamic retarder is actuated, a quantity of fluid corresponding to the desired braking performance is introduced into the turbine blade area and the rotor impels the oil against the stator so that a braking action is exerted on the rotor.

In electrodynamic retarders, on the other hand, the principle used for braking is that of the action of force in electromagnetic fields. Here, a stator is provided with several energizing coils and attached to the transmission housing. Air-cooled rotors are also provided on the transmission-gear side, which are usually connected to the drive shaft. For braking, the energizing coils are supplied with current and, as the rotors pass through the magnetic field, eddy currents are induced which impede the rotary movement of the rotors.

It will be recognized from the above brief description of retarders that unlike engine braking that provides braking force in discrete steps or increments dependent upon the transmission 18 gear ratio and the engine speed, the braking force provided by retarders is infinitely variable. It must also be recognized, however, that the nature and characteristics at least some retarders, such as electrodynamic retarders, allow the retarders to operate as stepped permanent brakes by controlling the electrical activation current to the electrodynamic retarder in steps or increments rather than on a continuously variable basis.

According to the present invention, permanent brakes are categorized as either stepped brakes or infinitely variable brakes and stepped brakes are exemplified by engine braking or by an electrodynamic retarder while infinitely variable brakes are exemplified by hydrodynamic retarders or by electrodynamic retarders.

The present invention further categorizes retarder type permanent brakes as either primary or secondary retarders wherein primary retarders are arranged on the input side of the transmission 18, that is, on the engine 16 side of the transmission 18, and secondary retarders are arranged on the output side of the transmission 18. This means that the braking forces provided by primary retarders are primarily a function of the engine speed while the braking forces provided by secondary retarders are primarily a function of the vehicle speed. Also, it will be apparent that an engine 16 operating in engine braking mode can only be a primary type permanent brake.

As previously stated, the present invention provides a method for maintaining a desired braking torque with optimum utilization of the wear-free permanent braking systems of a motor vehicle. For this, it is proposed to combine the strengths of the available stepped and variable braking systems, such as a hydrodynamic retarder operating as a variable primary brake with an electrodynamic retarder operating as a stepped secondary brake or an engine 16 operating as a stepped primary brake, in engine braking mode, with a hydrodynamic retarder operating as a variable secondary retarder In this way the weaknesses of the available various respective braking systems can be compensated.

Possible arrangements of stepped and infinitely variable permanent brakes 20 in a vehicle according to the present invention and according to the discussions just above are illustrated in FIG. 1. According to the present invention and as discussed above, a permanent brake 20 may be either a stepped permanent brake 20S or an infinitely variable permanent brake 20V, hereafter referred to as a "variable brake" in which the S and V suffixes indicate (S)tepped or (V)ariable permanent brakes.

Whether a given stepped or variable permanent brake 20S or 20V is a primary stepped or variable permanent brake is indicated by a second suffix appended to the reference numeral. e.g. the primary stepped and variable brakes are thereby designated by the reference numerals 20SP and 20VP while secondary stepped and variable brakes are designated by the reference numerals 20SS and 20VS.

Lastly, and as also described above, whether a permanent brake 20SP, 20VP, 20SS or 20VS is provided by engine braking or is a hydrodynamic brake or a electrodynamic brake is indicated by a third suffix to the reference numeral in which the third suffix is an M indicating motor (engine) braking, an H indicating a hydrodynamic brake, or an E indicating an electrodynamic brake.

Figure 2:
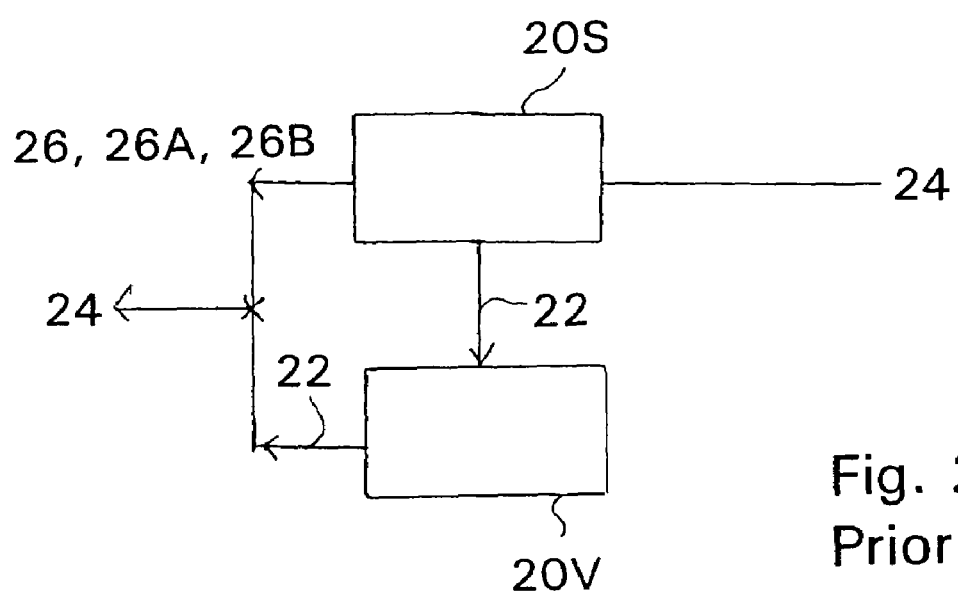
FIG. 2 is a flow diagram illustrating operation of the present invention.
Figure 3:
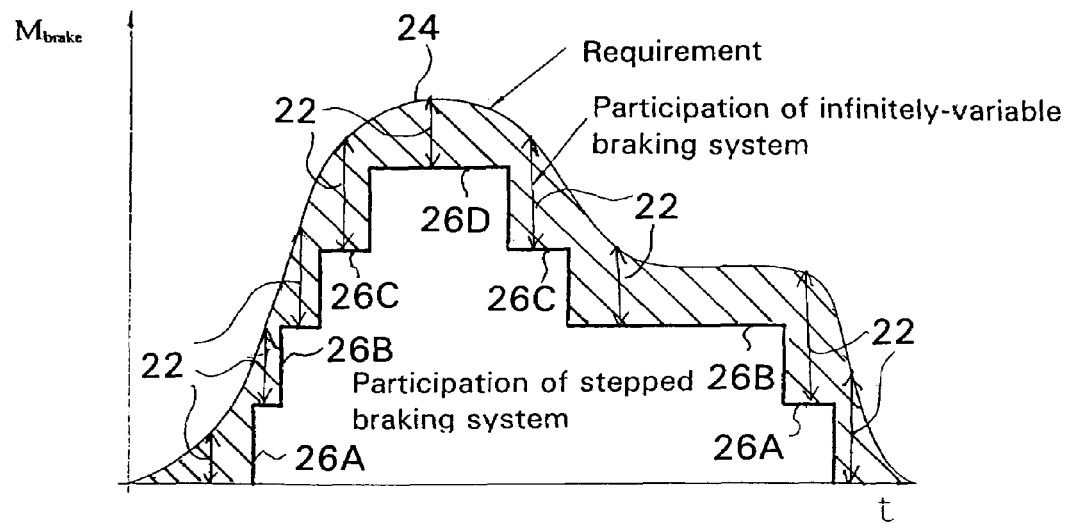
FIG. 3 is a representation of the function "constant speed on the gradient" with the aid of a combination of different wear-free braking system in accordance with the invention.
Figure 4:
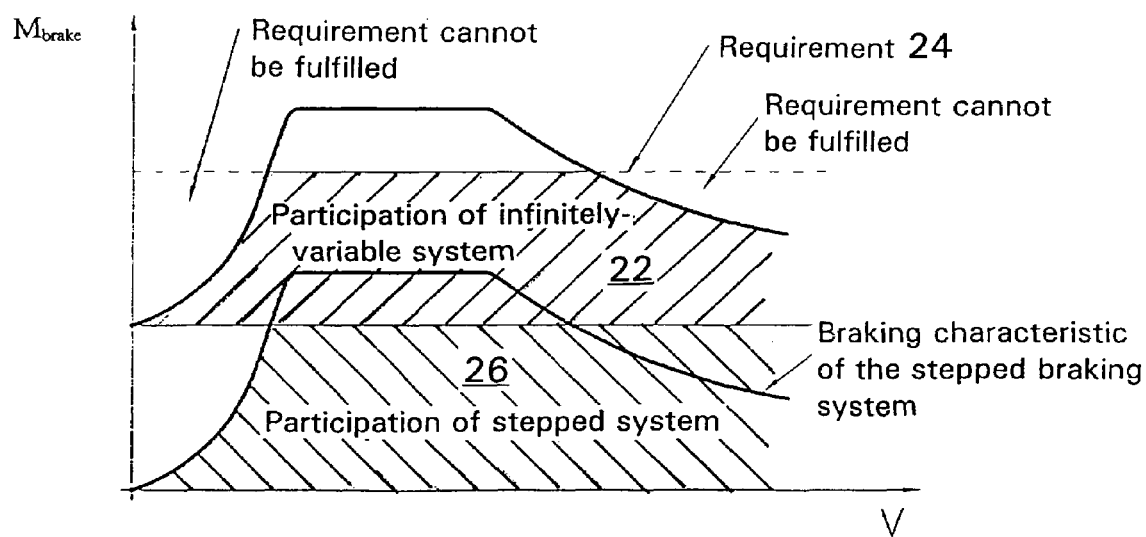
FIG. 4 is a representation of the function "constant braking torque" and "constant retardation" with the aid of a combination of different wear-free braking systems in accordance with the invention.

The method of the present invention for using stepped and infinitely variable permanent brakes is illustrated in FIGS. 2. 3 and 4. FIG. 2 is a flow diagram illustrating the basic method of the present invention for using a stepping permanent brake and an infinitely variable permanent brake to obtain a desired braking force. FIG. 3 illustrates the method with respect to obtaining a desired braking force providing a constant vehicle speed, as on a gradient, and FIG. 4 illustrates the method with respect to obtaining a desired braking force that is constant.

Referring to FIG. 2. in order to obtain a desired braking force and according to the present invention, a stepped braking system 20S (such as an engine brake 20SPM; or electrodynamic secondary retarder 20SSE) is activated and the difference 22 to achieve the effective necessary specified braking torque 24 is made up with an infinitely-variable braking system 20V (such as a hydrodynamic retarder 20VPH or 20VSH).

According to the invention, the activation of the stepped braking system 20S (such as a 20SPM or 20SSE) takes place when the required specified braking torque 24 is at least larger than the step 26A of braking torque of the stepped braking system 20S. The residual torque difference 22 must be large enough for the infinitely-variable system 20V (such as a 20VPH or 20VSH) not to be immediately deactivated. For example, if the necessary total braking torque 24 is larger than the braking torque 26 that can be obtained by the step 26B of braking torque of the stepped braking system 20S, then the stepped braking system 20S increases its braking torque to step 2 braking torque 26B and the infinitely-variable braking system 20V reduces its braking torque 22 by the same amount. The same applies for the other steps in the same way.

In this, the stepped braking system can be activated in one or more steps.

The system limits of the "constant speed on a gradient" function are thus displaced in the direction of lower speeds and a larger speed range can, therefore, be covered.

FIG. 3 further illustrates the way in which the method operates with the aid of a braking torque-time diagram.

As a function of the required braking torque M brake 24, a stepped braking system 20S is used with simultaneous activation of an infinitely-variable braking system 20V in such manner that the sum of the participations of these different systems, at any time t, provides the required braking torque 24. The step 26 (26A–26D . . . ) of the stepped system 20S to be activated in each case is calculated from the braking torque required 24 so that the residual torque difference 22 or the participation of the infinitely-variable system 20V is large enough for the infinitely-variable system 20V not to be immediately deactivated. This ensures that the infinitely-variable system 20V contributes to the braking process to increase the driver's comfort.

To implement the "constant braking torque" or "constant retardation" function, the procedure is as shown in the braking moment-speed diagram of FIG. 4. Here too, the stepped braking system 20S is activated when the necessary specified braking torque 24 is at least larger than the first step 26 of the stepped braking system 20S. The residual torque difference 22 must again be large enough for participation of the infinitely-variable system 20V not to become zero.

Thanks to the method according to the invention, the characteristic feature of primary retarders to give rise to abrupt braking torque changes when a gear change occurs can be compensated. It is also possible, when changing down in thrust operation to compensate for the lack of braking torque during the gear-shift process by maintaining a constant braking torque or retardation independently of gear-shift processes.

The invention claimed is:

1. A method for providing a desired braking torque in a vehicle, the method comprising the step of:
    determining a desired braking torque for the vehicle;
    activating a stepped retarder braking system during braking of the vehicle
    wherein the stepped retarder braking system has a capability of providing a plurality of steps of braking torque and a stepped braking torque provided by the stepped retarder braking system is a function of one of engine speed and transmission speed, by
        comparing the plurality of steps of braking torque that can be provided by the stepped retarder braking system with the desired braking torque and determining a step of braking torque which is less than the desired braking torque; and
    activating an infinitely-variable retarder braking system in cooperation with the stepped retarder braking system to provide a combined braking torque representing a difference between the step of braking torque provided by the stepped braking system and the desired braking torque, an infinitely variable braking torque provided by the infinitely variable retarder braking system is a function of one of engine speed and transmission speed and so that a sum of a braking torque of the stepped retarder braking system is continuously combined with the braking torque provided by the infinitely-variable retarder braking system to provide the desired braking torque.

2. The method according to claim 1, further comprising the step of obtaining the desired braking torque from one of a "constant speed on a gradient" function, a "constant braking torque" function and a "constant retardation" function.

3. The method according to claim 1, further comprising the step of selecting a braking torque less than the desired braking torque to be provided by the stepped retarder braking system so that a difference between the step of braking torque provided by the stepped retarder braking system and the desired braking torque is sufficiently large that the infinitely variable retarder braking system provides an infinitely variable braking torque continuously with the stepped braking torque provided by the stepped retarder braking system during braking of the vehicle.

4. A method for maintaining a desired braking torque with optimum utilization of wear-free braking systems of a vehicle, the method comprising the step of:
    combining in the vehicle drive train a stepped retarder braking system and an infinitely-variable retarder braking system, wherein a stepped braking torque provided by the stepped retarder braking system and an infinitely variable braking torque provided by the infinitely variable braking system are each dependent upon one of engine speed and transmission speed;
    determining a desired braking torque for the vehicle;
    activating the stepped retarder braking system during braking of the vehicle;
    wherein the stepped braking system has a capability of providing a plurality of steps of braking torque, by
        comparing the plurality of steps of stepped braking torque that can be provided by the stepped braking system with the desired braking torque and determining a step of braking torque which is less than the desired braking torque; and
    activating the infinitely-variable braking system in cooperation with the stepped retarder braking system to provide a second braking torque representing a difference between the step of braking torque provided by the stepped braking system and the desired braking torque so that a sum of a stepped braking torque of the stepped braking system is continuously combined with the second braking torque provided by the infinitely-variable braking system to provide the desired braking torque.

5. The method according to claim 4, further comprising the step of obtaining the desired braking torque from one of a "constant speed on a gradient" function, a "constant braking torque" function and a "constant retardation" function.

6. The method according to claim 4, further comprising the step of selecting a braking torque less than the desired braking torque to be provided by the stepped retarder braking system so that a difference between the step of braking torque provided by the stepped retarder braking system and the desired braking torque is sufficiently large that the infinitely variable retarder braking system provides an infinitely variable braking torque continuously with the stepped braking torque provided by the stepped retarder braking system during braking of the vehicle.

* * * * *